Oct. 15, 1935.  H. W. BOLENS  2,017,524
POWER OPERATED MOWER
Filed Sept. 8, 1933   2 Sheets-Sheet 2
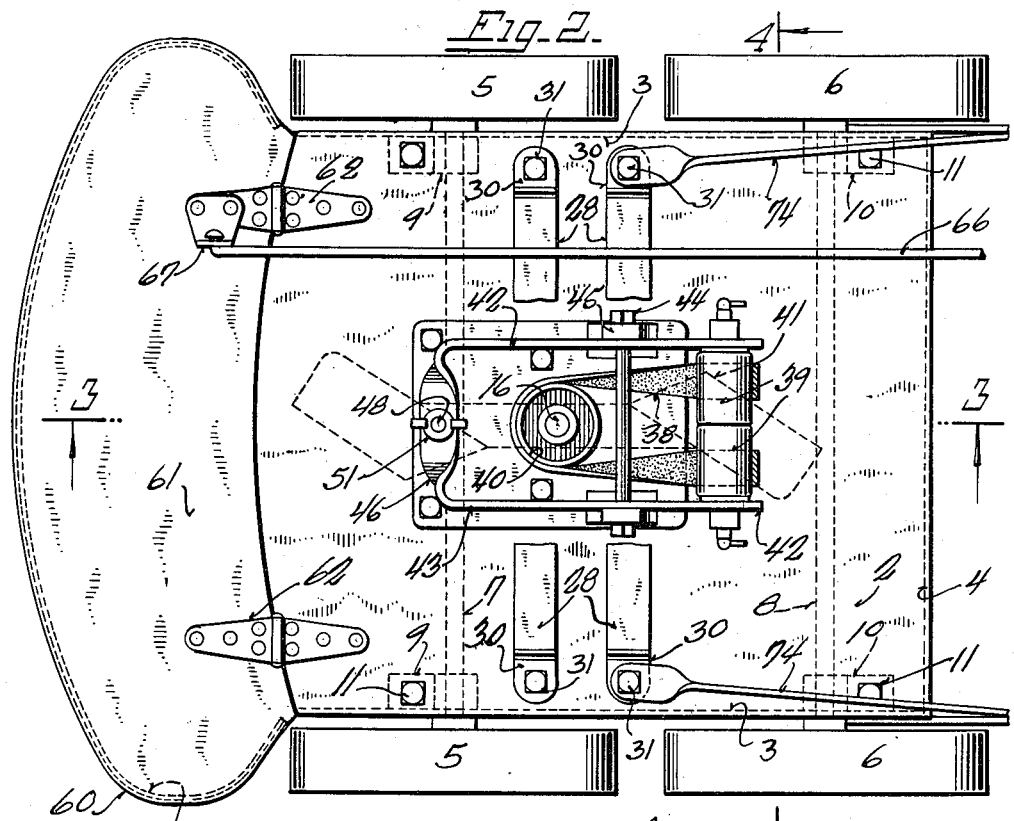
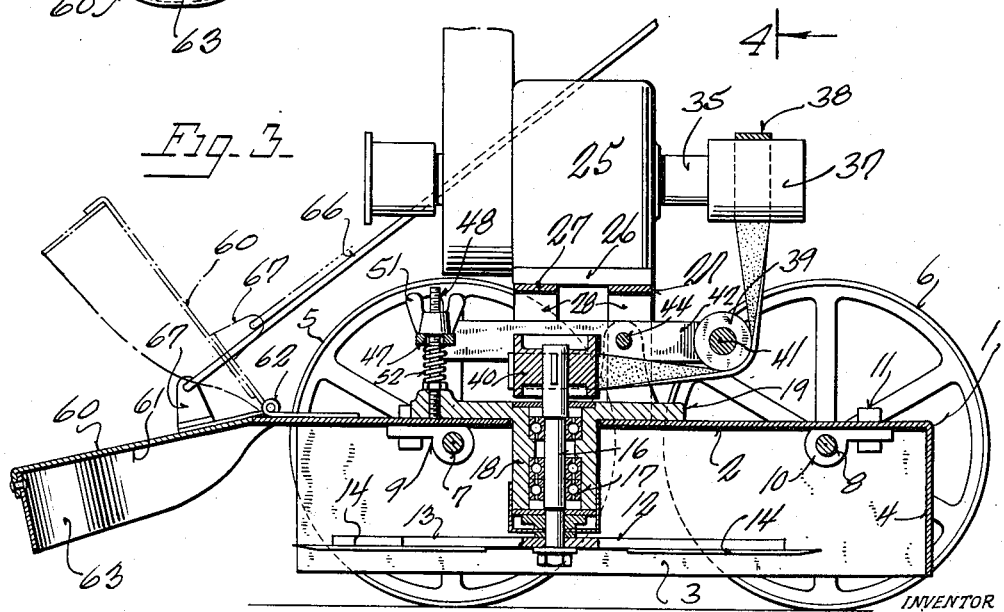
INVENTOR
Harry W. Bolens
BY
ATTORNEY.

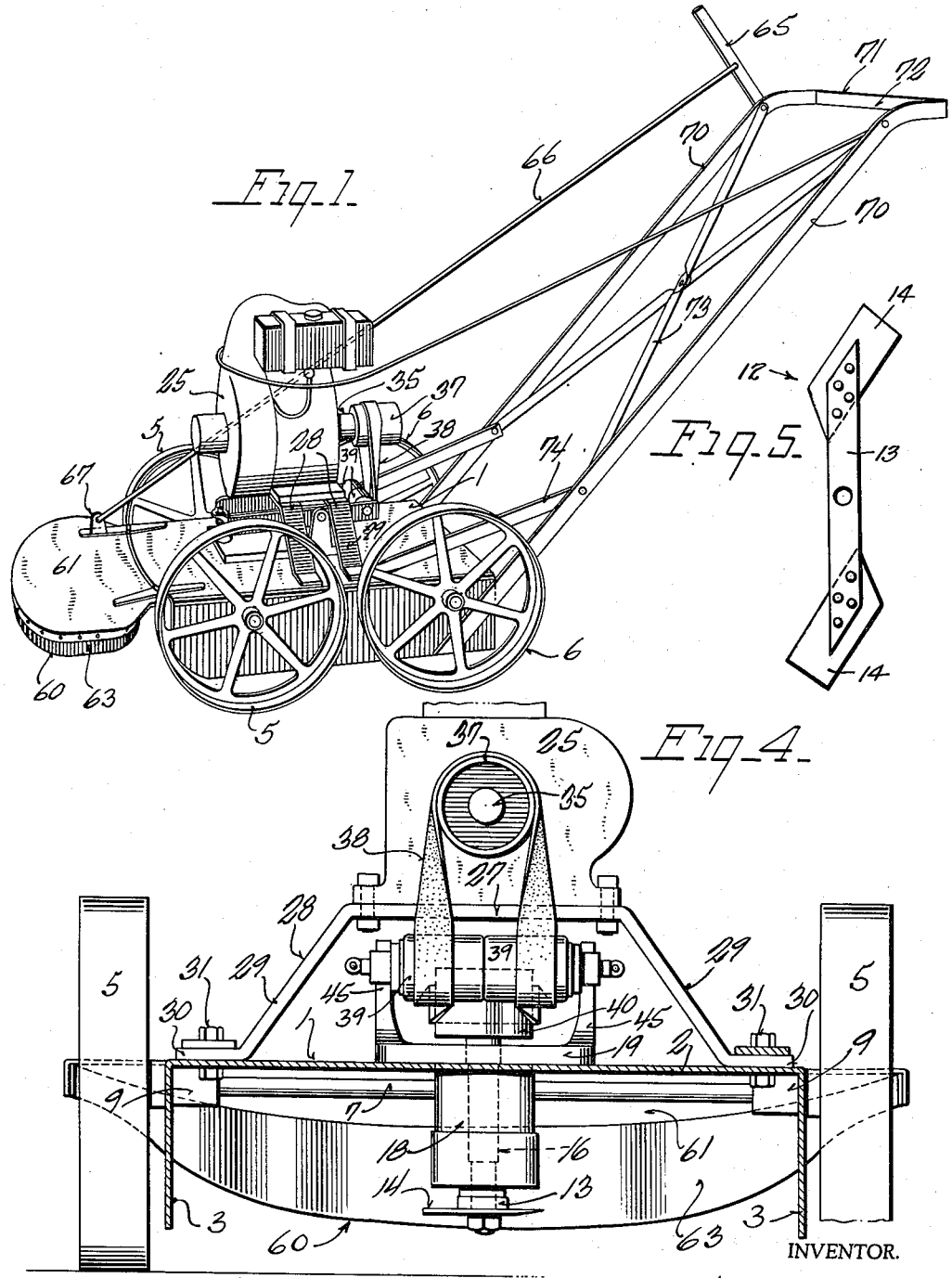

Patented Oct. 15, 1935

2,017,524

UNITED STATES PATENT OFFICE 2,017,524

POWER OPERATED MOWER

Harry W. Bolens, Port Washington, Wis.

Application September 8, 1933, Serial No. 688,559

4 Claims. (Cl. 56—25)

This invention relates to an improvement in power operated mowers of the type employing horizontally rotatable cutters.

Among the objects of the invention are to provide a power operated mower of this type wherein the motor, cutter and cutter housing are so compactly and advantageously organized and mounted as to provide a mower which is easily steered and handled and which is susceptible of easy and economical manufacture from materials and by means of facilities ordinarily available.

Another important object of the invention is to provide a mower of this type in which the rotatable cutter blade is completely enclosed and guarded and yet the guard is so organized with the cutter housing that it may be temporarily shifted out of the way when high or heavy brush or other vegetation difficult to cut with the guard in position is encountered.

Other objects and advantages reside in certain novel features of the construction, arrangement and combination of parts which will be hereinafter more fully described and particularly pointed out in the appended claims, reference being had to the accompanying drawings, forming a part of this specification, and in which:

Figure 1 is a perspective view showing a power mower embodying the present invention;

Figure 2 is a fragmentary plan view of the mower, the motor and portions of its mounting brackets being broken away and portions of the guiding belt being broken away and shown in section for the sake of illustration;

Figure 3 is a view in vertical section taken on line 3—3 of Figure 2 and showing the motor and driving pulley assembled with the mower, the motor and driving pulley being shown in side elevation;

Figure 4 is a view in transverse vertical section taken on line 4—4 of Figure 2; and Figure 5 is a top plan view of the cutter.

Referring to the drawings the numeral 1 designates generally a housing constructed preferably of appropriately heavy and stiff sheet metal and having a top 2 from which side walls 3 and a rear end wall 4 extend downwardly. The housing is substantially imperforate and any openings except at the front and bottom of the housing are filled or occupied as will hereinafter appear.

The housing is mounted on front ground wheels 5 and rear ground wheels 6, the ground wheels being provided in pairs with the members of the pair of wheels 5 being rotatably mounted on the outer ends of an axle 7. The wheels 6 are similarly mounted on the outer ends of an axle 8. The axles 7 and 8 extend transversely through the housing and project through the side walls thereof and they are mounted in bearings designated at 9 and 10, the bearings being appropriately secured as at 11 to the underside of the top wall 2 of the housing adjacent the sides thereof.

Within the housing a double blade, horizontally disposed, rotatable cutter 12 is provided and comprises a cutter holder 13 to the ends of which cutter blades 14 are appropriately secured. The center of the holder 13 is suitably fixed to the lower end of a cutter shaft 16. Shaft 16 is supported for rotation in bearings 17 mounted within a cylindrical bearing sleeve 18, the upper end of which extends through an opening in the top wall 2 of the housing and has a flange 19 resting upon and secured to this top wall.

Overlying the upper end of the shaft 16 is a driving motor designated at 25 and which may consist of a gasoline engine. The base 26 of the motor casing rests on the horizontal portions 27 of a pair of motor brackets designated generally at 28. These motor brackets have downwardly inclining end portions 29 terminating in horizontal extremities 30 which bear flatly against and are secured as at 31 to the top of the casing or housing 1. As shown, the motor brackets 27 extend transversely of the housing, are parallel to each other and are symmetrically disposed with respect to the transverse center line of the housing. This affords a balanced construction and facilitates steering and handling of the mower.

The engine shaft 35 has a driving pulley 37 fixed thereon and engaging a driving belt 38. The belt 38 is deflected by the idlers 39 of a belt tightener and guide so that vertical runs thereof are provided between the driving pulley and the idlers whereas horizontal runs thereof occur between the idlers and a driven pulley 40 fixed to the upper end of the shaft 16. The idlers 39 of the belt tightener are supported for free rotation on a short shaft 41 extending between and secured to end portions of the side members 42 of a floating frame 43, the frame having its intermediate portion pivotally supported on a pivot pin 44 mounted in bracket lugs 45 and having its end portion 46 twisted and formed with an opening 47 through which a bolt 48 extends. The lower end of the bolt is fastened to the flange 19 and the upper end thereof has a wing nut 51 threaded thereon. Between the end portion 46 of the floating frame and the flange 19 a coil spring 52 is provided. The spring 52 pushes upwardly on the end portion 46 of the floating frame and hence tends to urge the idlers 41 downwardly to tighten the belt. The extent to which the belt is tightened is limited by the wing nut 51 which, being threaded on the shaft 48, may be returned to provide the desired adjustment. The idler rollers 39 may move away from the belt or in the direction in which they loosen the same if the forces tending to so move them is sufficient to overcome the action of the spring 52.

With a mower constructed in this manner the double blade cutter may be rotated at a very high rate of speed and when so rotated it is very efficient in the cutting of grass, brush or other vegetation. The rapidly rotating blades are apt to strike and forcibly project pebbles, small stones, small pieces of wood or other objects. Any such are, however, intercepted by the side or rear walls of the housing or by a guard designated generally at 60 and provided at the front of the housing. The guard 60 consists of a plate 61, the rearward edge of which is mounted on the top wall of the housing 1 at the forward end thereof by means of hinges 62. The front and side edges of the guard have a downwardly extending flange 63 fastened thereto and of such vertical extent as to provide an effective guard structure, one which will intercept any objects thrown off by the blades of the cutter. For controlling the position of the guard, a lever 65 is provided and connects by means of an elongated rod 66 with a lug 67 seclured to and upstanding from the plate 61. The lever 65 is mounted on one of the side members 70 of a U-shaped handle, the body portion 72 of which provides a handle bar and the lower ends of the side members of which are fastened to the housing. The side members of the handle 71 are cross braced as at 73 and their interconnection with the housing is stiffened and enhanced by means of braces 74, each of which has one end secured to the intermediate portion of a side member of the handle and its other end connected to one end of one of the motor brackets 28 and to the housing 1.

While I have shown and described one embodiment of the invention, it is to be understood that it has been selected merely for the purposes of illustration and that various changes in the size, shape and arrangement of the parts may be made without departing from the spirit of the invention and the scope of the subjoined claims.

The invention claimed is:

1. A mower of the character described comprising a wheel supported housing having a closed top and sides and a closed rear end and open at its bottom and at its forward end, a horizontally disposed rotatable cutter operable in said housing, means for rotating the cutter, and a guard adjustably supported on the housing, extending transversely of and positionable to block the opening at the forward end thereof and thereby intercept objects that might be thrown forwardly from the cutter and also positionable to leave the forward end of the housing open to facilitate cutting of high growths.

2. A mower of the character described comprising a wheel supported housing having a closed top and sides and a closed rear end and open at its bottom and at its forward end, a horizontally disposed rotatable cutter operable in said housing, means for rotating the cutter, a guard pivotally mounted on the housing, extending transversely of the opening at the forward end thereof and positionable to block the opening at the forward end thereof whereby to intercept objects that may be thrown forwardly from the cutter and also positionable to leave the forward end of the housing open to facilitate the cutting of high growing, and manually operable means for shifting said guard.

3. A mower of the character described comprising a wheel supported housing having a closed top and sides and a closed rear end and open at its bottom and at its forward end, a horizontally disposed rotatable cutter operable in said housing, a light weight high speed motor mounted on the housing and geared to the cutter to rotate the same at a high speed, and an imperforate guard pivotally supported at the forward end of the housing, extending transversely thereof and positionable to block the opening thereof to intercept objects that may be thrown forwardly from the rapidly rotating cutter and also positionable up out of the way to leave the front of the housing unobstructed whereby to facilitate the cutting of high growths.

4. A mower of the character described comprising a wheel supported housing having a closed top and sides and a closed rear end and open at its bottom and at its forward end, a horizontally disposed rotatable cutter operable within the housing and a guard plate having its rear edge portion hingedly supported at the forward end of the housing extending transversely of the opening in the forward end of the housing and shiftable to a position to block such end or to a position to leave the forward end of the housing open.

HARRY W. BOLENS.